United States Patent [19]
Rhodes

[11] 4,107,643
[45] Aug. 15, 1978

[54] UNIDIRECTIONAL HORIZONTAL SEISMOMETER

[76] Inventor: William A. Rhodes, 4421 N. 13th Pl., Phoenix, Ariz. 85014

[21] Appl. No.: 802,268

[22] Filed: May 31, 1977

[51] Int. Cl.² .............................................. G01V 1/16
[52] U.S. Cl. ................................... 340/17 R; 73/653; 73/665; 181/122
[58] Field of Search ............... 340/17 R; 73/653, 665

[56] References Cited

U.S. PATENT DOCUMENTS

| | | | |
|---|---|---|---|
| 2,581,063 | 1/1952 | Alexander | 340/17 R X |
| 3,026,428 | 3/1962 | French | 340/17 R X |
| 3,164,983 | 1/1965 | Perkins, Jr. et al. | 340/17 R X |
| 3,555,886 | 1/1971 | Thornton | 73/665 X |
| 3,709,030 | 1/1973 | Aselman, Jr. | 73/653 X |

Primary Examiner—Maynard R. Wilbur
Assistant Examiner—T. M. Blum

[57] ABSTRACT

A fluid film levitated horizontally oriented disc is self-centering and floating above another similar mating surface stationary disc. A means for varying the natural period of free oscillation of the levitated disc within the normal earthquake band of frequencies and a means for damping out such free oscillations along with a means for transducing positional differences between the discs into signals wherein earth tremors arriving from any horizontal direction may be recorded.

3 Claims, 4 Drawing Figures

UNIDIRECTIONAL HORIZONTAL SEISMOMETER

This invention relates to unidirectional horizontal seismometers.

In order to register horizontal components of earthquakes arriving from all directions, present practice requires the use of two pendulum systems mounted at right angles to each other. Such instruments are usually large and heavy and it is difficult, if not impossible, to achieve the same identical natural periods in exact synchronism to simultaneously provide a more exacting record of horizontal information arriving from all directions.

It would be highly advantageous therefore to remedy the deficiencies of the prior art.

Accordingly, it is an object of the present invention to combine the functions of two horizontal seismometers.

Another object of the invention is to provide a seismometer whose transduced signals are always in perfect phase relationship and synchronism.

Another object of the invention is to provide a seismometer which combines the functions of two common pendulum systems at a cost substantially no greater than one such pendulum system.

Still another object of the invention is to provide capability for altering the natural period of free oscillation with each axis, automatically exact synchronism at any period of oscillation chosen as pertains to amplitudes, periods and phasing.

And, yet another object of the invention is to provide a dual axis output long period seismometer weighing only a fraction of the present long period single axis pendulum seismometers.

Briefly to achieve the desired objectives of the present invention in accordance with a preferred embodiment thereof the instant invention relates to a disc, fluid levitated above a stationarily mounted counterpart disc below wherein the design may encompass the choice of two means for automatic centering of the levitated disc. The First Mode is to provide a pair of discs, substantially flat to the eye but with spherically shaped surfaces, each mating with the other with the common radius of curvature focusing several hundred feet above said surfaces.

An example of such is through the use of glass telescope blank discs wherein such curves are attained by grinding each on the other by the same technique used in making telescope mirrors. The final curve is attained, as will be further detailed, and the procedure ceases with fine grinding because, since it is impractical to visually inspect such curve through reflected light due to its long radius, a spherometer is used against each surface. Polishing is, of course, unnecessary.

It should be stated that moderate curve mismatch in the final grind does not effect function appreciably. However, matching curvature is somewhat automatic in such procedure. After final grind, the static base disc, which should be larger than the active element above, is drilled through its center to permit levitation of the upper element by air or other fluid injection. Likewise, multiple orifices through the static base disc may be multiple and spaced away from the exact center thereby providing a diffused air or fluid entrance.

The static base disc is mounted concave face up with air or fluid hose attachment thereunder, upon a stationary rigid support containing leveling devices thereunder. The upper dynamic disc is placed convex face down in the center of the base disc. On top of this is placed a lead or other metal cap weight. Since critical damping must be uniform, a post is attached to the top of the metal mass. There are several choices of damping media. The post may hold a cup with viscous fluid therein, a stationary cylindrical vane element rigidly coupled with the stationary rigid support underneath dips into this fluid and through its vertical adjustment screw allows this vane to be adjusted for proper critical damping.

An alternate damping method is to mount a copper plate on the post and a permanent magnet with its magnetic flux vertically oriented on the stationary adjustable means above to achieve the same result. In the event magnetic damping is chosen, then all materials attached to the upper disc must be of non-magnetic material to prevent objectionable interference.

Since this invention will produce response to a 360° coverage of arriving horizontal ground movements, at least two transducing means are required. These may be mounted at quadrature locations, i.e., 90° apart around the central axis.

In the present disclosure, the above are shown as photoelectric cells. However, many other transduction means are available to those skilled in the art.

Such transduction means are mounted as stated, their centers representing the periphery of an eclipsing disc of metal or plastic mounted upon the post of the levitating system.

If magnetic damping is chosen, then a copper disc may serve both for damping and photocell eclipsing. as If viscous damping is chosen, then the fluid cup is attached to the top of the eclipsing disc. An exciter lamp with direct current applied is provided in a housing above on the vertical axis to illuminate a translucent or frosted plate of plastic which in turn provides diffused illumination for the photocells. To those skilled in the art, alternating current may also be used on the exciter lamp and a photocell bias, if the output is desired to pass through a low frequency audio amplifier to be further processed for recording.

With the aforementioned arrangements, it is now obvious that regardless of the direction of an arriving earth tremor, the eclipsing disc being part of the dynamic system will change position in exact proportion in opposition to positional changes in the stationary support system. Resultant X and Y signals are then processed and recorded by an X and Y recorder. The eclipsing disc should be in close proximity to the photocell surfaces to maintain sufficient shadowing of eclipsed portions. A flat black should cover all surfaces within this chamber which might reflect light obliquely in the cells. The foregoing is one example of several alternatives available. The main substance claimed pertains to the levitated disc system with an alternate method of centering, which may be combined with the first centering method.

While the above system combines the use of curved surface discs coupled with gravity to return the top disc toward concentricity with the bottom disc, the alternative is to utilize the same mechanical arrangement but with discs flat ground and coupled to a vertical magnet field to accomplish centering.

In this event, a vertically polarized magnet is mounted on the central axis of the fluid levitated disc; indeed it may take the place of the aforementioned post.

Another magnet of opposite polarity is positioned stationary above on the same axis and during levitation the mass of the levitated disc will seek to align in concentricity with the bottom disc. Natural period may then be varied by controlling the vertical position distance of the upper magnet in relation to the lower magnet. Under such conditions, the use of magnetic damping is avoided in favor of viscous damping. This mode appears capable of a greater period variation than any single radius of curvature combination of the previous mode. However, it has been shown that both modes may be integreated, i.e., curved disc surfaces with gravity plus magnetic centering along with viscous damping.

Fundamentally then, both modes involve similar circumstances. Each is levitated, and each is drawn toward a central axis of an underlying stationary surface. One uses curved surfaces which causes gravitational centering; the other being flat ignores gravity but derives its centering from a vertical magnetic field.

In the first curved/gravity mode, increased air or fluid volume increases spacing between discs, providing the upper disc with a lesser apparent static base curvature, thus lengthening its natural period. If fluid volume is increased further, a point is reached where the upper disc surface no longer "sees" a curved base surface underneath. At this time, the upper disc becomes unstable and at first will wander aimlessly about. If fluid injection is further increased, the upper disc will move toward the edge of the lower disc, dump its support film and settle into contact there.

The second flat/magnetic mode, depending entirely on magnetic flux influence, ignores injected fluid film spacing and gravity. But, when film spacing increases to the point where radial laminar film flow is destroyed, turbulence destroys stability, causing wandering about as before.

Through experiment, it has been shown that both modes may be incorporated in one instrument using a pair of spherically curved surfaces with both magnetic and gravitational centering. Under controlled circumstances of design and operation, it is found that each mode separately, when combined provide a range of response not attained through the use of first or second mode alone.

The foregoing, and further and more specific objects and advantages of the instant invention will become readily apparent to those skilled in the art from the following detailed description of the preferred embodiments thereof, taken in conjunction with the drawings in which:

FIG. 4 shows a plan sectional view taken from the line 4—4 of FIG. 1.

Figure 1:
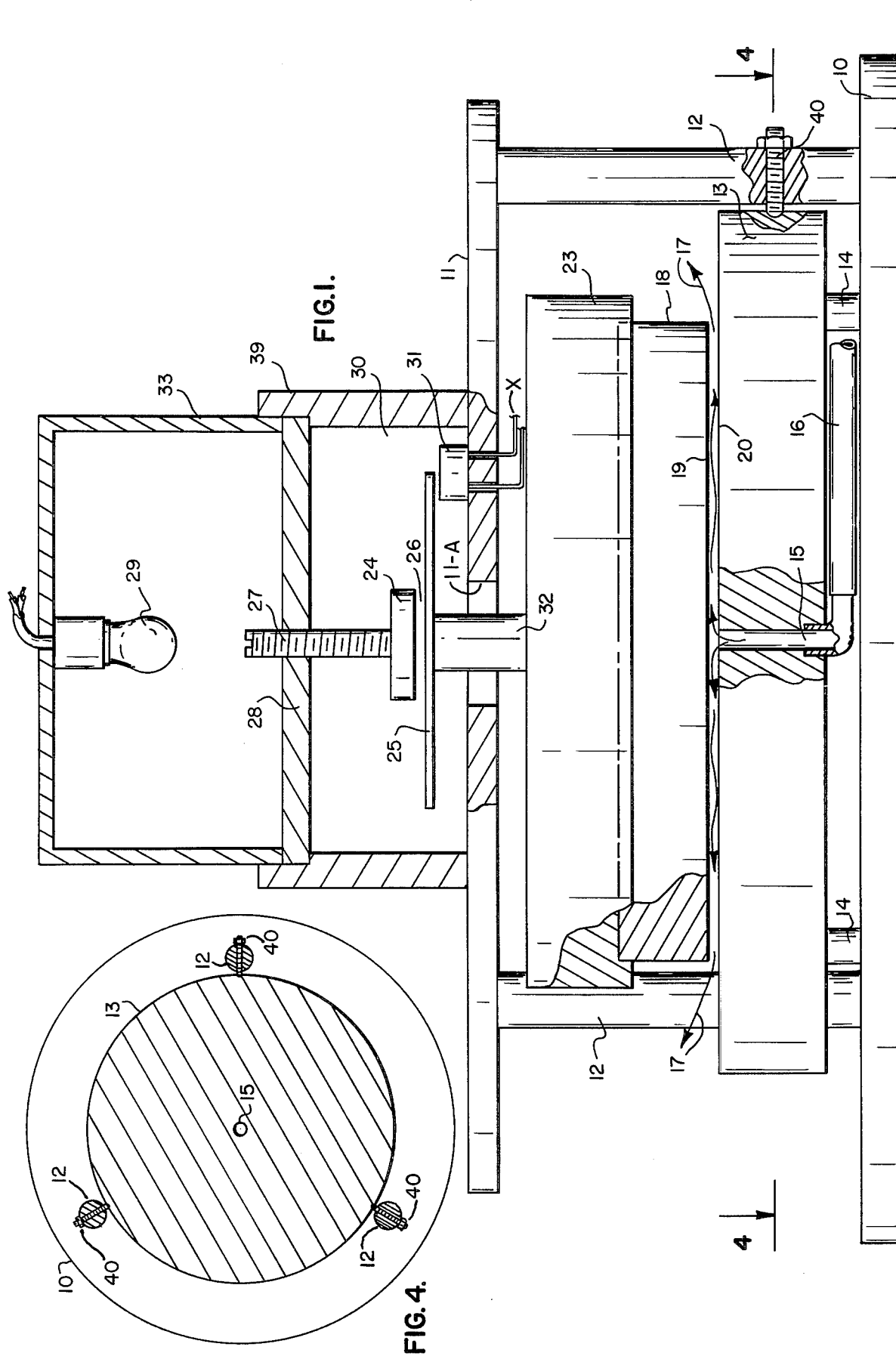
FIG. 1 is a side view of a unidirectional horizontal seismometer in accordance with the present invention showing magnetic damping.

Due to the use of the extremely long radius of curvatures involved in the mating surfaces of the First Mode and also the necessity of referring to these surfaces as flat in the Second Mode, no attempt has been made to curve such surfaces in the drawing of FIG. 1 at 19 and 20.

Turning now to the drawings in which the same reference characters indicate corresponding elements throughout the several views it will be noted that since the Second Mode of flat surfaces magnetically axially aligned are an alternative of the First Mode of curved surfaces with gravity alignment, the First Mode will predominate herein with pertinent references to the Second Mode where applicable.

As seen in FIG. 1, horizontal stationary support shown at 10 includes a leveling means for the same, not shown. Elevated plate 11 is attached to base 10 by three posts 12.

FIG. 4 shows a plan section as taken along line 4—4 of FIG. 1, and shows all three posts 12. In both FIGS. 1 and 4 concentricity alignment screws 40 align 11 at the periphery of disc 13.

The undersurface of stationary disc 13 is attached by three legs 14—14, one not being shown, to 10, either by gravity or other means. A hole 15 is provided for air or fluid through tubing 16 to be injected through disc 13 and exiting around the periphery at 17—17.

As shown at 18 is the mating dynamic disc. Both discs may be made of a vitreous material such as boro-silicate glass, however they may also be made of metal if surface treatment can provide stable mating of surface contours. An example of dimensional choice is for the bottom disc 13 to be 8 inches in diameter and the top disc 18 to be 6 inches in diameter; said discs being ground as aforementioned.

FIRST MODE

If spherical surfaces are chosen wherein gravity will act to center disc 18 over disc 13, choice of proper radius is determined so that the natural periods available will fall within the natural periods desired. Such periods at the lowest possible levitation, i.e., lowest air or fluid admittance at 15, must be within the range usable in seismological practice and also the effect of increased levitation spacing, i.e., increased fluid volume, on the natural period.

The simple formula equation used is as follows:

$$375.4/Hz^2 = \text{Inches}/12 = \text{Radius in feet.}$$

The natural period is substantially the same in case of such segments of spheres as with a pendulum of the same radius from its support point in space above. An example of optimum radius for such surfaces is 5000 inches/416.66 feet/ 127 meters. This provides the upper face of the 8 inch diameter disc 13 with a sagitta of 0.0016 inches, which means its center is 0.0016 inches deeper than its edge, concave.

The six inch disc 18 is convex by 0.0009 inches which mates with the former. Calculations for a pendulum with a radius of 416 feet provides a natural period of about 11.32 seconds per Hertz. This same radius on 13 and 18 represented herein provides a slightly longer minimum period because levitation of 18 as represented by air or fluid separation of the matched surfaces at 19 and 20 result in an increase of theoretical radius.

The probable cause of this is that surface 19 senses an apparent increase in elevation and thus a decrease of sensed curvature from surface 20. As fluid or air volume is further increased, this forces the general surface 18 to sense the curvature of 20 to a still lesser degree. In other words, fluid film begins to rule period duration as the slight curvature drops away.

When 18 becomes film separated to a point where no curvature of 20 is sensed by differentials of pressure, then 18 becomes unstable since gravity can no longer function as a centering means.

Figure 2:
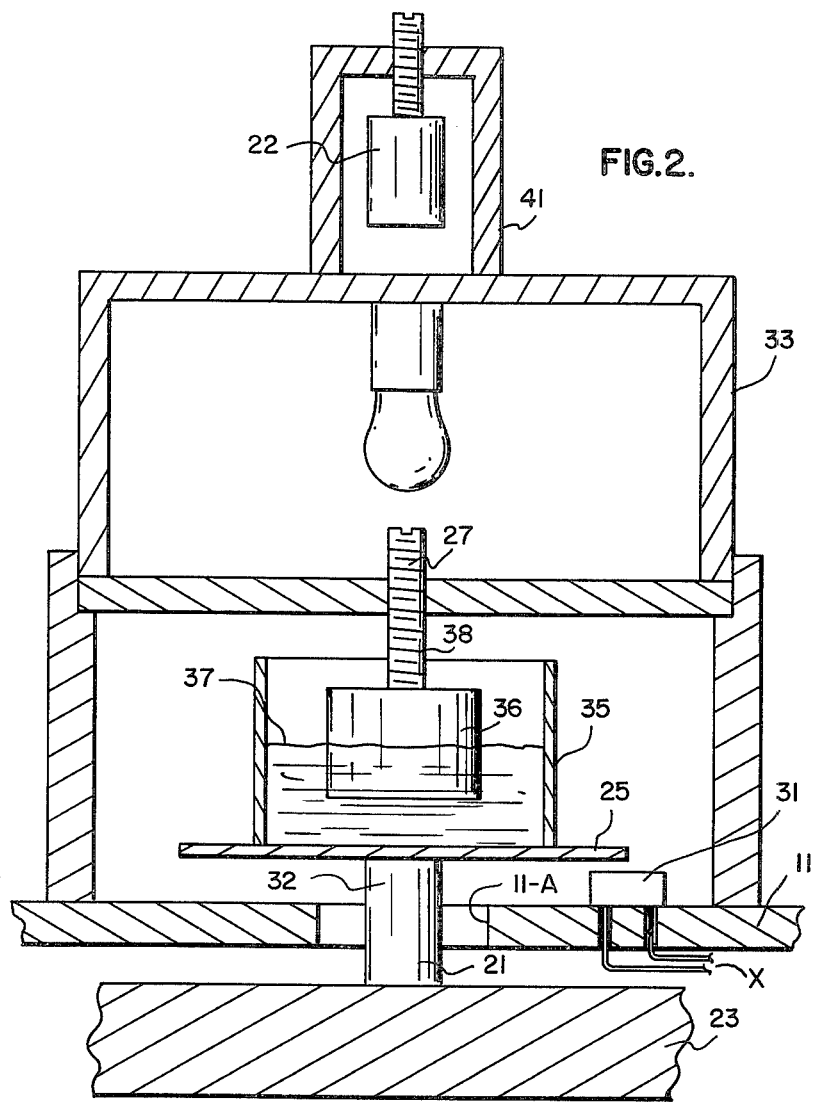
FIG. 2 shows substitution of viscous fluid damping as an alternative to magnetic damping of FIG. 1, showing the use of magnetic flux centering when fluid film separated surfaces of FIG. 1 are either curved or flat.

At or near this unstable point through application of Second Mode elements consisting of magnets 21, and 22 of FIG. 2, considerably longer periods become available than by use of curvature versus gravity alone. Polarities of magnets 21 and 22 are such as attract. They may be adjusted for flux density by predetermination of flux before installation, or through vertical adjustment of 22.

SECOND MODE

In the Second Mode, the surfaces 19 and 20 of discs 13 and 18 are flat planes, depending solely on magnetic concentricity alignment as seen in FIG. 2, 21 and 22 aforementioned.

This Mode develops a pseudo "radius" and adjusts over a range similar to the First Mode curvature/gravity system.

Setting of natural period in this Second Mode is totally dependent on magnetic flux vertically present.

Fluid film injection of any low rate guaranteed to keep surfaces 19 and 20 out of contact is sufficient for the full range including shorter periods with higher density magnetic fields not available to First Mode unless a radius of curvature is so short it would permit such. Such short radius would relegate such instruments forever to that area of periods, which as the radius grows short, so does the latitude of variability.

The objection to the Second Mode is that ferro-magnetic objects nearby might cause a permanent bias on magnet 21 which in turn would pull the levitated system to one side necessitating either a removal of the object, or slightly off leveling of the support structure.

As aforementioned, maximum fluid injection in any case is just before laminar flow turns to turbulent flow. Such interference appears lower and generally acceptable in the First Mode because of gravitational effects on disc 18 within the curvature of disc 13, again depending on size and proximity of ferro-magnetic materials versus injected film thickness.

In First Mode when injected air film separation is at an acceptable maximum level, providing the longest period available for that curvature, placing a light on the opposite side and viewing separation, it will be noticed that at the center no light passes through, the remainder being illuminated. At the point where light can be seen throughout the entire width, instability begins to develop. In the Second Mode the entire separation passes illumination regardless of film thickness.

The description above provides the basics for using curved and plane surfaces in levitation along with the combination of magnetic and gravitational centering which respond to earth movements of the stationary elements. The following provides examples of operational data.

In FIG. 1, 23 represents a lead cap. Weight of this element during tests shown here was 3.5 kilograms. It provides sufficient mass to reduce or eliminate most small instabilities due to air movement about the instrument. Without cap 23, disc 18 alone can be levitated at about one tenth cubic foot of air per hour. At 0.5 cubic foot, instability appears. With cap 23, levitation begins at about 0.25 cubic foot and instability does not appear until in the vicinity of 5. cubic foot air/hour. With no damping, 0.5 cubic foot air provides a free swinging oscillation period of 16 seconds per Hertz, which coincides with increased period for the particular curvature with such film separation.

1. cu.ft. air provides 17.5 second Hz.
2 cu.ft. = 21 seconds/Hz.
3 cu.ft. = 24 seconds/Hz.
4 cu.ft. = 30 seconds/Hz.
5 cu.ft. = 35 seconds/Hz.

As the weight of cap 23 is increased, longer periods become available and more fluid pressure is required. No explanation is offered for this phenomenon in view of the theoretical radius.

As seen in FIG. 1, First Mode, a fixed damping magnet 24 faces a disc 25 of low ohmic resistance metal such as copper, silver or aluminum. Magnet 24 is adjusted to produce sufficient hysterisis reaction against 25 at air gap 26. To utilize such magnet configuration shown, the magnet should be composed of the recent compounds as rare-earth-cobalt.

Otherwise, insufficient damping would occur and the damping system would have to be designed around a heavier magnet with closed field, i.e., North-South poles facing each other with disc 25 therebetween.

Critical damping is achieved when magnetic hysterisis just prevents overswinging of the levitated system 18, 23, 32 and 25 of FIG. 1, after it is displaced in any horizontal direction. Adjustment screw 27 allows such adjustment to be made, 27 being held by translucent or frosted diffusing plate 28 which diffuses light coming from lamp 29 into chamber 30 where is passes the disc 25 edge and onto one half of photocells 31 and 34 of FIGS. 3 and 1, when levitated system is axially centered by leveling means under base structure 10. Chamber 30 wall is cylindrical and is of metal or opaque plastic material 39, as is lamp housing chamber 33.

It should be noted that in either First or Second modes, axial damping is requisite since off-axis damping can produce slight oscillatory movement around the vertical axis and, while this might not be a hinderance to readout from transducers, harmonic distortion is a possibility. Likewise, in event magnetic damping is chosen, post 32 must be of non-ferrous material to avoid magnetic interaction.

Figure 3:
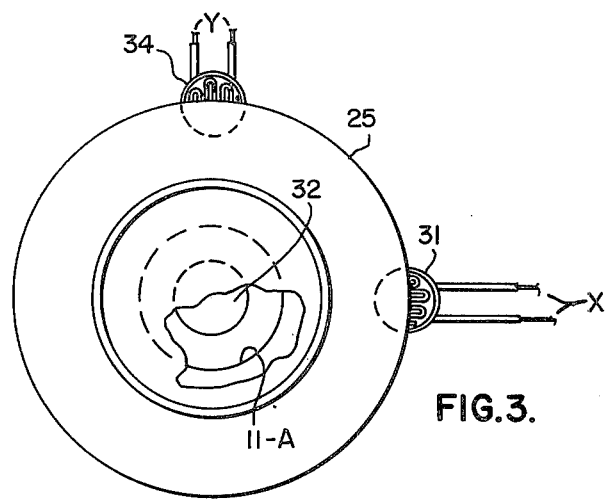
FIG. 3 is a partial plan view of the central region of FIGS. 1 and 2 showing the quadrantly located photoelectric devices.

Since it is desired to read out horizontal earthquakes in a 360° circle, two photocells or other transducer means must be used as previously shown in FIG. 3 at 31 and 34 providing X and Y readout leads as shown, into appropriate networks and recorders.

FIG. 3 shows damping disc 25 half covering photocells 31 and 34 at concentric alignment of discs 13 and 18. Also shown is post 32, of non-ferrous material, which in case of Second Mode will be a magnet 21. Through support plate 11 is a passage 11-A as seen in FIGS. 1 and 2. Plate 11 may be made of laminated phenolic. As seen in FIG. 2, the alternative use of a viscous damping system is provided as cup 35 is made an integral part of eclipsing disc 25. Cylindrical vane 36 is submersed in viscous fluid, for example Dow dilicone 200 having 12,500 centistokes viscosity. The approximate level is 37.

Critical damping is achieved by adjusting screw 27 as it is turned downward. As shown in FIG. 2, the eclipsing disc 25 may be of brass or it, and the cup 35, may be a single plastic part. In any event, it must be of non-magnetic material if the Second Mode is chosen. Also, with such choice magnet 22 adjustment holding fixture 41, its support 33 and all materials used throughout, gain reliability by avoidance of ferro-magnetic materials.

Since silicones, like oils, tend to creep over dry surfaces, even though such creep is of little consequence over the cup, such creep can be minimized or virtually eliminated by spraying or coating these parts with a fluorocarbon such as Teflon. Viscous damping, as in FIG. 2, may be used in both Modes aforementioned and in First Mode, post 21 of FIG. 2, and 32, FIG. 1 should be non-magnetic material unless the Second Mode is used or where magnets 21, 22 of FIG. 2 are in use.

Photocells best suited in the example herein were found to be of sufficient diameter to provide large active areas whereby substantially linear electrical changes occur with linear movement of the levitated elements as they move disc 25. Several photocell types were used during experiments, photovoltaic, and photoconductor. The latter was found best because of large power handling capability. Virtually any response time is acceptable because of the slow transit times of earth movements. Cadmium sulfide cells proved adequate in all cases.

Air supply need not be greater that 2 to 5 p.s.i. and volume delivery through a flow gauge from 0.5 to 6 cu.ft.hr. may be delivered from most vibratory acquarium pumps.

When originally activated, appropriate indexes may be provided for rough leveling. However, it was found that a precision 360° level mounted on the same plane of surface 20 is adequate if such level and static element are pre-aligned and affixed to that plane.

Once levitated and leveled, each time fluid or air is injected, the dynamic element requires at least five to ten minutes to settle down. It is always best to start the pump with needle valve off, then gradually turn injected air up to operating level. Starting the pump with immediate delivery produces a slight thump as levitation of the dynamic system comes loose from the mating surface 20. This requires a longer period for settling down than the previous.

As can be seen in FIG. 1, most of which is an example represented here is held together by gravity only. Disc 13 may rest on 10 with appropriate three legs at 14 thereunder or may be flat seated on top of 10 with fluid passage coming through 10.

If photoconducting cells are chosen, bias voltage to each should be sufficient to allow rather low light flux from exciter lamp 29 of FIG. 1. One to two candlepower in the yellow-red region permits almost any tungsten filament to operate with infinite lifetime. Current supply for the same must be of excellent regulation with no more than one tenth millivolt irregularity in photocell output. Another excellent source which dispenses with power connection is a luminous tritium lamp, which gives a pure unvarying illumination.

First and Second Mode choices carry with them the following comparibility arrangment of components and materials. There are several physical entities to consider, a few of which are:

Disc surfaces: Curved or flat
Damping Means: Viscous fluid or magnetic hysterisis.
Axial centering: Gravitational or magnetic.

Some combinations leading toward results obtained are:

First Mode

Surfaces: Curved, spherical section.
Centering: Gravitational
Damping: Viscous fluid or Magnetic
Period alteration: Control of fluid film thickness.

Second Mode

Surfaces: Flat
Centering: Magnetic axial.
Damping: Viscous fluid.
Period alteration: Control of vertical magnetic flux density.

First and Second Modes Combined

Surfaces: Curved, Spherical section
Centering: Gravitational and magnetic combined
Damping: Viscous fluid
Period alteration: Fluid film thickness plus vertical magnetic flux density.

Having fully described and disclosed the invention and the preferred embodiments thereof in such clear and concise terms as to enable those skilled in the art to understand and practice the same the invention claimed is:

1. A unidirectional horizontal seismometer comprising: a horizontal stationary support with leveling means; first and second discs; said first disc having a concave surface; said second disc having a convex surface of equal and opposite curvature in relation to said first disc; said first disc being horizontally coupled with said stationary support; fluid admittance means communicating with the concave surface of said first disc; the convex surface of said second disc directed downwardly in contact with the concave surface of said first disc, whereby when a fluid is injected between said discs through said fluid admittance means, said second disc is levitated upon a film of fluid therebetween thus permitting the force of gravity to cause said second disc to seek a central concentric relationship with said first disc; the convex surface of said second disc as coupled by said fluid film to said first disc surface facing vertically upward causing the center of radius of curvature to exist in space above said curvature, whereupon fluid levitated said second disc when horizontally displaced relative to said first disc, assumes a natural period of oscillation similar to a pendulum of substantially the same radius of curvature; said oscillations being responsive to earth movements in opposition to said second disc movement through said stationary support, from any horizontally arriving earth tremor thereunder and from any horizontal direction; said response thereby causing horizontal positional changes of said first disc relative to said second disc; and means for transducing signals from such differential relative positions into an appropriate recording system; the radius of said curvature chosen for both said discs providing oscillations similar to those of a pendulum oscillating from the center of the curvature of said discs and thereabove within the spectral range of natural frequencies created by earthquakes; and further choice of special bands of frequency period response within the total range depending upon said radius of curvature periods being amendable to change toward longer periods as said fluid film is increased, thus causing wider separation between both said surfaces; and a means for damping out free oscillations of said second disc.

2. A unidirectional horizontal seismometer comprising: a horizontal stationary support with leveling means; first and second discs; each of said discs having a flat surface; said first disc being horizontally coupled with said stationary support; fluid admittance means communicating with the flat surface of said first disc; the flat surface of said second disc directed downwardly in contact with the flat surface of said first disc; first magnetic means of vertical flux attached to the axial center top of said second disc; second magnetic means of vertical flux secured to said stationary support and positioned on same vertical axis alignment as said first magnetic means and oriented to attract each other; means for varying the degree of flux attraction therebetween, whereby when a fluid is injected between said discs through said fluid admittance means, said second disc becomes levitated upon a film of fluid therebetween, thus permittimg magnetic flux field acting between said first and second magnetic means to cause said second disc to seek central concentric relationship with said first disc; whereupon the fluid levitated said second disc where horizontally displaced in relationship to said first disc, will assume a natural period of oscillation; said natural period depending on degree of flux density attraction between said first and second magnetic means; said oscillations being responsive to earth movements in opposition to said second disc movement through said stationary support from any horizontally arriving earth tremor thereunder and from any horizontal direction; said response thereby causing horizontal positional changes of said first disc relative to said second disc; and means for transducing signals from such differential relative positions into an appropriate recording system; combined spacial magnetic flux density from both said magnetic means being chosen to allow said second disc to assume said natural horizontal oscillation periods which are within the spectral range of natural frequencies created by earthquakes; and adjustment means for altering said second disc natural periods by changing the density of said vertical axial magnetic spacial flux; and means for damping out free oscillations of said second disc.

3. A unidirectional horizontal seismometer comprising: a horizontal stationary support with leveling means; first and second discs; said first disc having a concave surface; said second disc having a convex surface of equal and opposite curvature in relation to said first disc; said first disc being horizontally coupled with said stationary support; fluid admittance means communicating with the concave surface of said first disc; the convex surface of said second disc directed downwardly in contact with the concave surface of said first disc, whereby when a fluid is injected between said discs through said fluid admittance means, said second disc is levitated upon a film of fluid therebetween thus permitting the force of gravity to cause said second disc to seek a central concentric relationship with said first disc; the convex surface of said second disc as coupled by said fluid film to said first disc surface facing vertically upward causing the center of radius of curvature to exist in space above said curvature, whereupon fluid levitated said second disc when horizontally displaced relative to said first disc, assumes a natural period of oscillation similar to a pendulum of substantially the same radius of curvature; a means for extending said natural period beyond this limit comprising a first magnetic means of vertical flux attached to the axial center top of said second disc; a second magnetic means of vertical magnetic flux secured to said stationary support and positioned on the same vertical axis alignment as said first magnetic means and oriented to attract each other; means for varying the degree of magnetic flux attraction therebetween; said vertical magnetic flux thereby interacting with the force of gravity upon said second disc thereby allowing stable natural periods of oscillation to exist when said film of fluid therebetween is in excess of permissible thickness of surface separation space between said first and second discs as reacted upon by gravity toward said concentricity relationship to allow longer natural periods to be attained than could otherwise occur with gravitational fluid thickness separation relationship alone; said oscillations being responsive to earth movements in opposition to said second disc movement through said stationary support, from any horizontally arriving earth tremor thereunder and from any horizontal direction; said response thereby causing horizontal positional changes of said first disc relative to said second disc; and a means for transducing signals from such differential relative positions into an appropriate recording system; the radius of said curvature chosen for said surfaces of both said discs providing oscillations similar to those of a pendulum oscillating from the center of the curvature of said discs and thereabove within the spectral range of natural frequencies created by earthquakes; and further choice of special bands of frequency period response within the total range depending upon said radius of curvature; a further stability beyond this stable maximum available with said curvature with its gravity, fluid separation relationship by utilization of said first and second vertical axial magnetic means; and a means for damping out free oscillations of said second disc.

* * * * *